United States Patent [19]
Harrison et al.

[11] 3,947,672
[45] Mar. 30, 1976

[54] DIGITAL DELAY LINE CORRELATOR

[75] Inventors: Raymond E. Harrison, West Caldwell; Marvin L. Kiss, Nutley; Douglas E. Ott, Newfoundland, all of N.J.

[73] Assignee: International Telephone and Telegraph Corporation, Nutley, N.J.

[22] Filed: Mar. 14, 1972

[21] Appl. No.: 234,596

[52] U.S. Cl. ............ 235/181; 343/13 R; 343/17.1 R; 343/100 CL; 328/110
[51] Int. Cl.² .......................................... G06G 7/04
[58] Field of Search ............ 235/181; 328/109, 110; 329/107; 340/146.2

[56] References Cited
UNITED STATES PATENTS

| | | | |
|---|---|---|---|
| 2,701,305 | 2/1955 | Hopper | 329/107 |
| 3,167,738 | 1/1965 | Westerfield | 235/181 |
| 3,463,911 | 8/1969 | Dupraz et al. | 235/181 |
| 3,495,077 | 2/1970 | Hiltz et al. | 235/181 |
| 3,509,464 | 4/1970 | Covill | 235/181 |
| 3,551,823 | 12/1970 | Stevens | 328/110 |
| 3,598,979 | 8/1971 | Moreau | 235/181 |

*Primary Examiner*—T. H. Tubbesing
*Assistant Examiner*—H. A. Birmiel
*Attorney, Agent, or Firm*—John T. O'Halloran; Menotti J. Lombardi, Jr.; Alfred C. Hill

[57] ABSTRACT

The correlator disclosed herein detects in a stream of input pulses a plurality of sequences of time spaced signals, each of the plurality of sequences having a different one of a plurality of pulse repetition intervals disposed within a given pulse repetition interval range. This is accomplished by clocking the input pulses into a first shift register by a first clock pulse having a given frequency. N groups of n bistable stages (N being an integer greater than one and n being an integer greater than zero) are disposed at different spaced time positions along the first register corresponding to the pulse repetition intervals and the pulse repetition interval range. First logic circuitry is coupled to each of the N groups of n stages to provide an output pulse when the time spaced pulses of the plurality of sequences of time spaced pulses are simultaneously present at appropriate ones of the n stages of a given number of the N groups of n stages. A second shift register receives on its input stage the output pulse from the first logic circuitry. The output pulse is clocked through the second register by a second clock pulse having the given frequency but phase shifted relative to the first clock pulse. The length of the second register is determined by the plurality of pulse repetition intervals. A plurality of stages at the end of the second register produce through second logic circuitry a gate pulse which predicts when the next pulse of each of the plurality of sequences should occur. Several embodiments are disclosed which enable the production of the output signal from the first logic circuitry when all the pulses of the plurality of sequences are present or when there is a pulse missing from any of the plurality of sequences. An additional embodiment is disclosed which enables the detection of M plurality of sequences of time spaced pulses when only (N-1) out of N pulses of each of the M plurality of sequences are present employing M first logic circuitry. A gate signal is produced by the second register and second logic circuitry for each of the output signals from the M first logic circuitry to predict when the next pulse of each of the plurality of sequences of the M plurality of sequence should occur.

19 Claims, 4 Drawing Figures

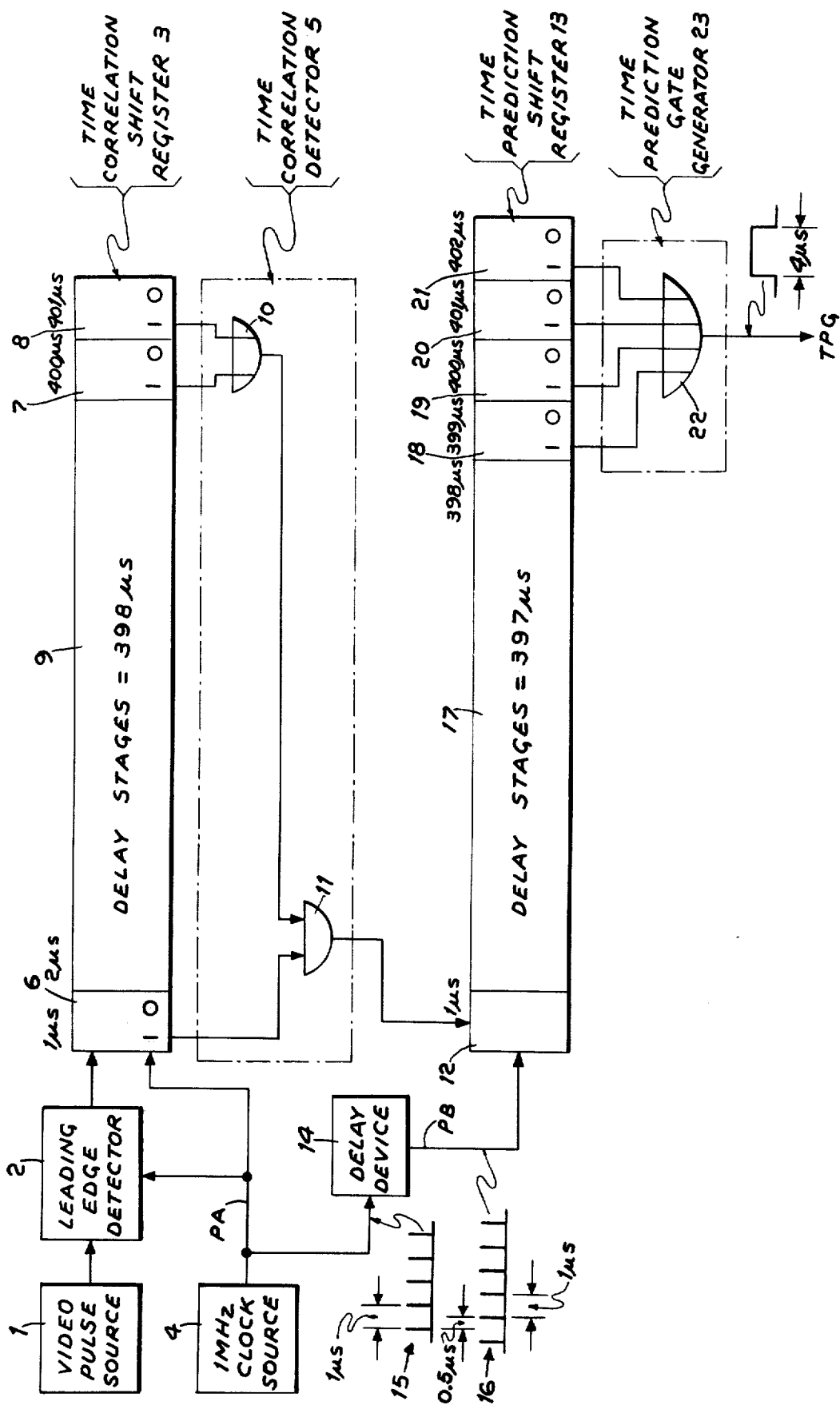

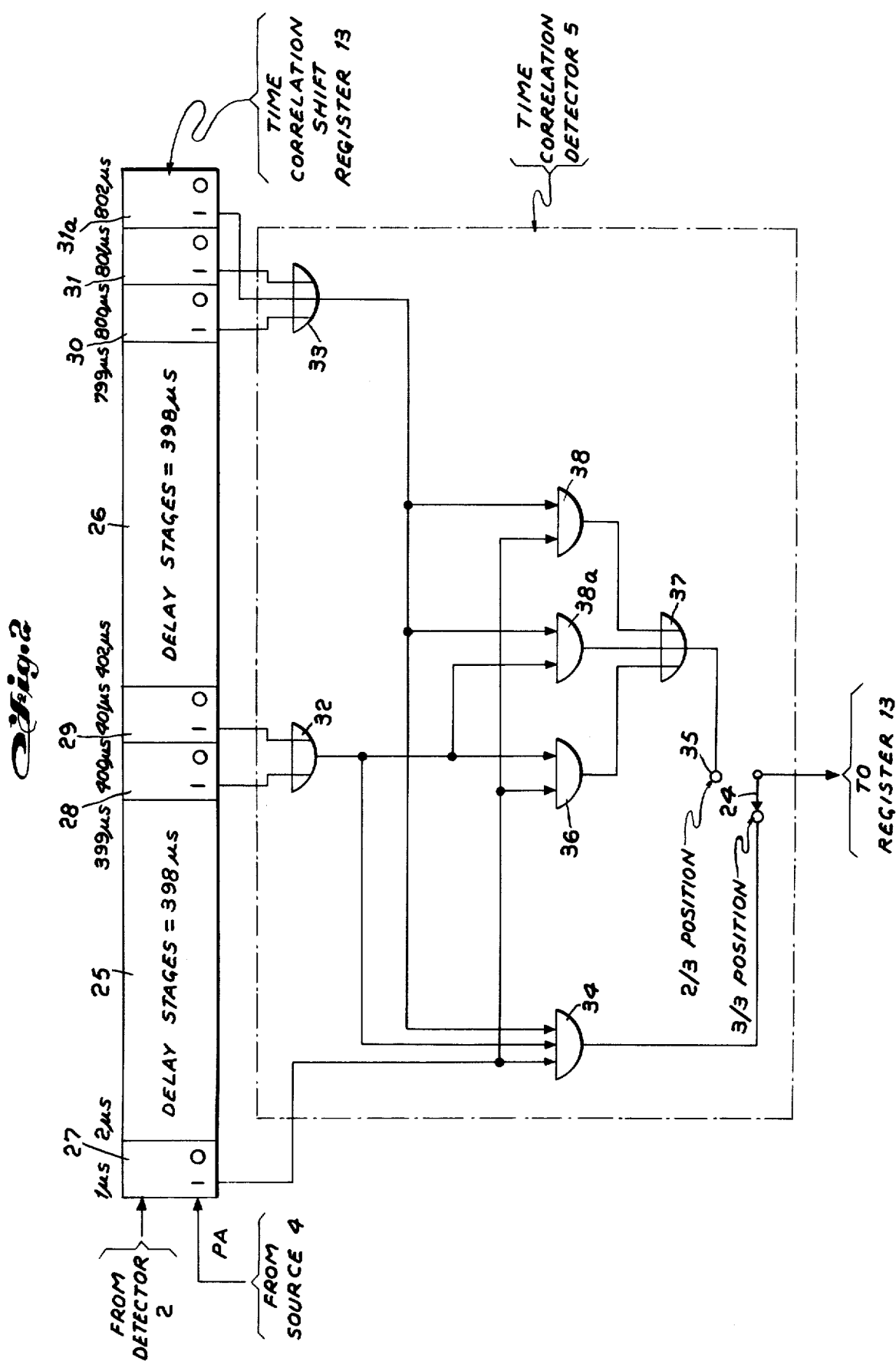

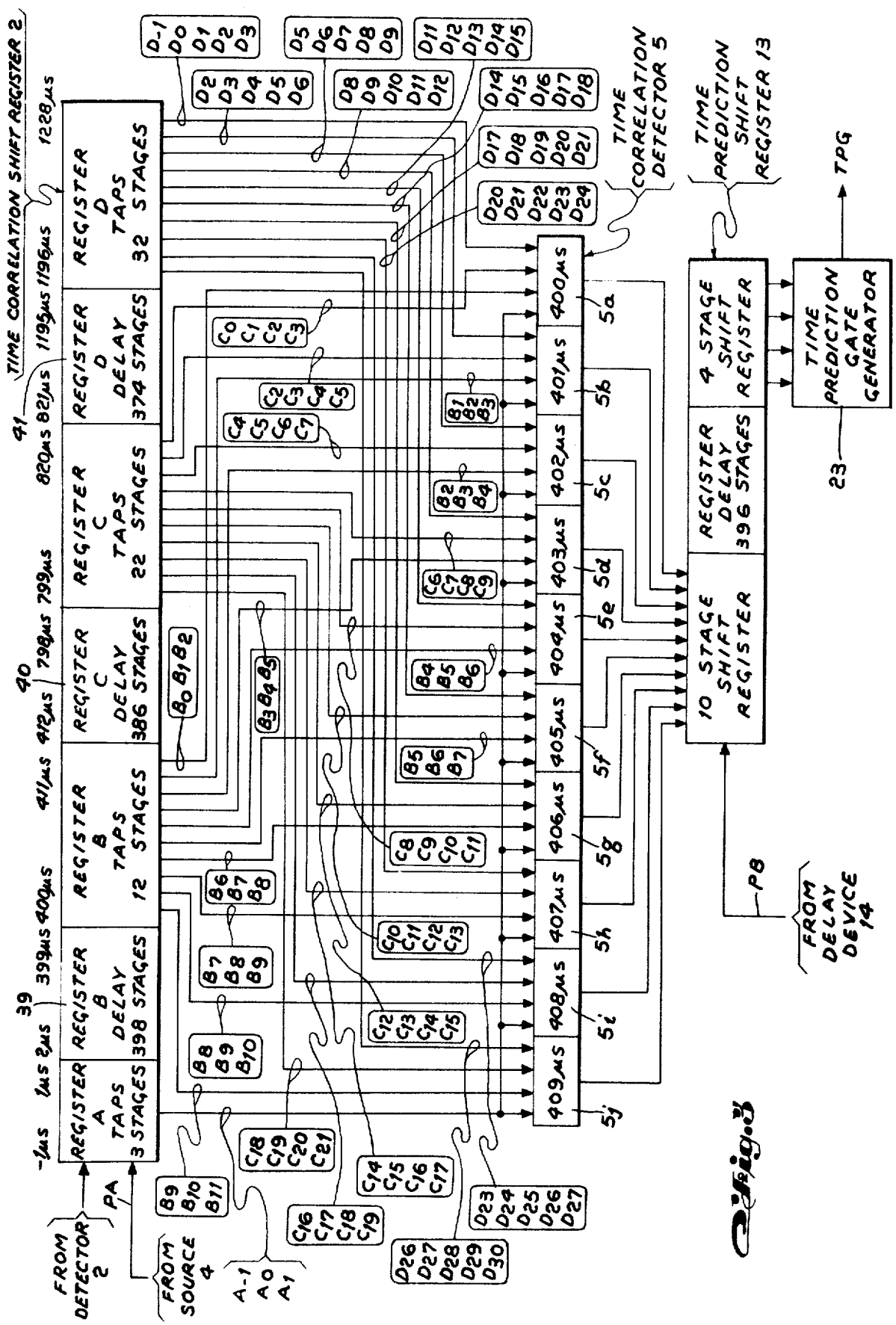

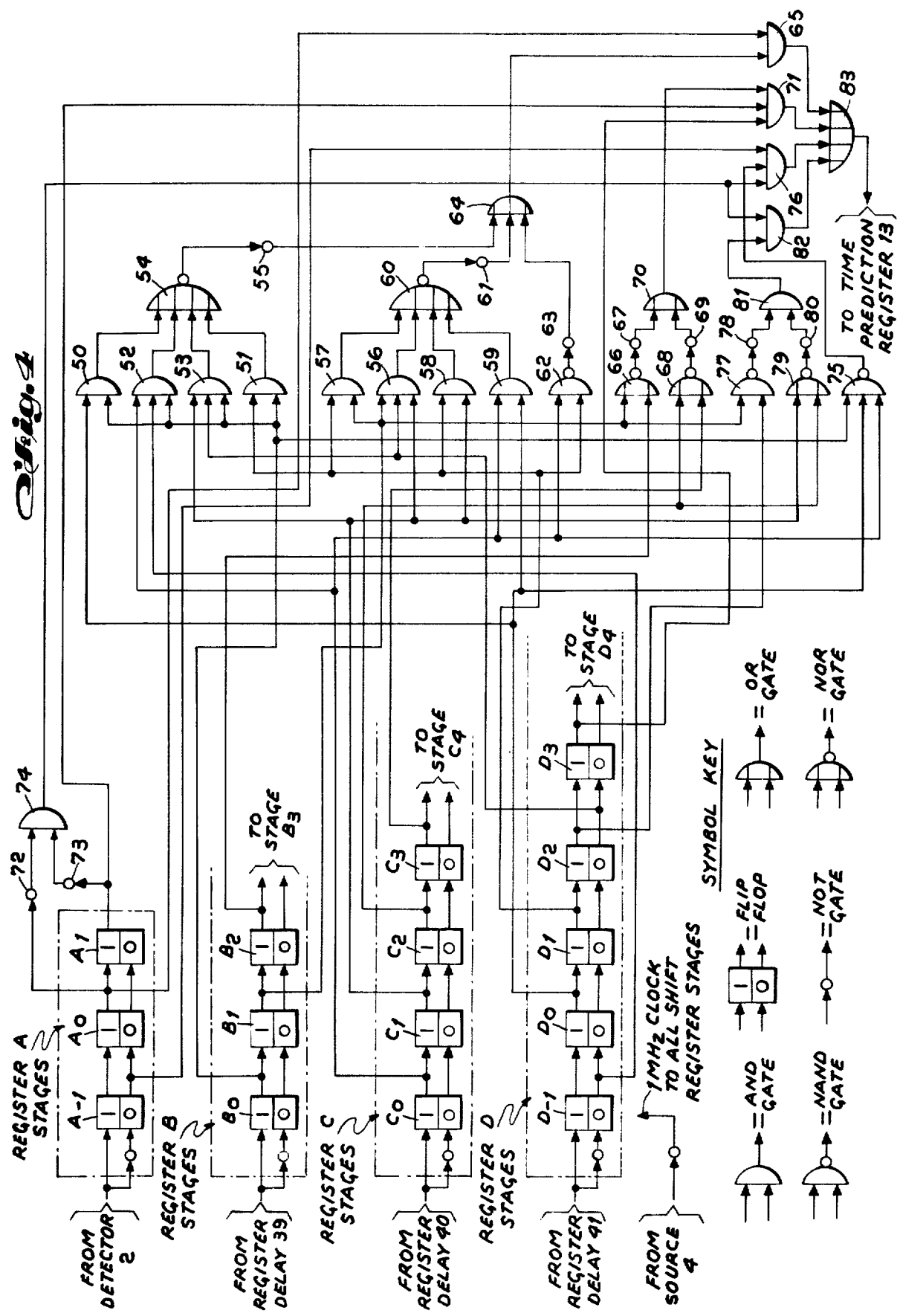

DIGITAL DELAY LINE CORRELATOR

BACKGROUND OF THE INVENTION

This invention relates to delay line correlators and more particularly to digital delay line correlators.

Delay line correlators known in the prior art including either analog delay lines or digital delay lines have been used to detect the pulse repetition interval (PRI) between the spaced pulses of a single sequence of time spaced pulses by means of a coincidence device (an AND gate) coupled to taps of the analog delay line or to flip flop stages of a digital delay line wherein the taps and flip flops are spaced along the delay line by the PRI intended to be detected.

Such delay line correlators find use in systems having a highly dense pulse environment such as encountered in navigation systems, such as TACAN, sonar systems, doppler radar systems, MTI (moving target indicator) radar systems, and seismology systems and the like.

In the foregoing system it may be desired to detect more than a single sequence of time spaced pulses having a given PRI. Following the techniques of the prior art delay line correlators, it would be necessary to provide a separate delay line and coincidence device for each PRI it is desired to detect which can lead to a complex and cumbersome detection system.

SUMMARY OF THE INVENTION

An object of the present invention is to provide a digital delay line correlator employing a single digital delay line capable of detecting a plurality of sequences of time spaced pulses present in a stream of input pulses, each of the plurality of sequences having a different PRI disposed within a given PRI range.

Another object of the present invention is to provide an arrangement coupled to the output of the time correlation detector (the logic circuitry coupled to the single delay line) to produce a gate pulse which predicts when the next pulse of each of the sequences should occur.

Still another object of the present invention is to provide a digital delay line correlator to detect a plurality of sequences of time spaced pulses, each of the plurality of sequences having a different PRI disposed within a given PRI range, even when one of the pulses of any of the plurality of sequences of time spaced pulses is missing.

A feature of the present invention is the provision of an arrangement to detect in a stream of input pulses at least a first plurality of sequences of time spaced pulses, each of the first sequences having a different one of a plurality of pulse repetition intervals disposed within at least one given pulse repetition interval range comprising: a first source of the stream of input pulses; a first means coupled to the source to store the stream of input pulses in time such that the time relationship of each of the input pulses relative to each other as received from the source is maintained, the first means having N groups of $n$ outputs disposed at different spaced time positions relative to each other such that the time difference between certain ones of the $n$ outputs of adjacent ones of the N groups of $n$ outputs define the plurality of pulse repetition intervals and the time difference between certain ones of the $n$ outputs of at least one of the N groups of $n$ outputs defines the given pulse repetition interval range, where N is an integer greater than one and $n$ is an integer greater than zero; and second means coupled to the N groups of $n$ outputs to provide an output pulse when the time spaced pulses of the first plurality of sequences of time spaced pulses are simultaneously present at certain ones of the $n$ outputs of a given number of the N groups of $n$ outputs.

Another feature of the present invention is the provision of a third means coupled to the above mentioned second means responsive to the output pulse therefrom to produce a gate pulse defining the time at which the next pulse of each of the first plurality of sequences should arrive from the first source.

Still another feature of the present invention is the provision of a longer digital delay line and a given number of different logic circuitry being coupled to selected ones of $n$ bistable stages of each of N groups of $n$ bistable stages to produce a plurality of independent output pulses each of which is produced by response to a different one of a given number of plurality of sequences.

BRIEF DESCRIPTION OF THE DRAWING

Above-mentioned and other features and objects of this invention will become more apparent by reference to the following description taken in conjunction with the accompanying drawing in which:

FIG. 1 is a schematic diagram in block form of one embodiment of the digital delay line correlator in accordance with the principles of the present invention;

FIG. 2 is a schematic diagram in block form of another embodiment of the time correlation digital delay line and time correlator detector that may be incorporated in the system of FIG. 1 in accordance with the principles of the present invention;

FIG. 3 is a schematic diagram in block form of still another embodiment of the digital delay line correlator in accordance with the principles of the present invention; and FIG. 4 illustrates a schematic diagram in block form one embodiment of one of the time correlation detectors of the system of FIG. 3 in accordance with the principles of the present invention.

DESCRIPTION OF THE PREFERRED EMBODIMENTS

The drawing and description thereof contained herein refer to certain definite clock pulse frequencies, PRI's and PRI ranges. It is to be understood, however, that these specific values are only presented for purposes of explanation. It would be obvious to one skilled in the art employing the techniques of the present invention to modify the specified values to meet the specification of particular equipment for detecting different PRI's in a different PRI range employing a different clock frequency.

Referring to FIG. 1 there is illustrated therein a digital time delay correlator in accordance with the principles of the present invention enabling detection of a plurality of sequences of time spaced pulses with each of the sequences having a different one of a plurality of PRI disposed within a given PRI range.

A stream of input pulses in a highly dense pulse environment, as encountered in the systems mentioned hereinabove under the heading "Background of the Invention", is provided from source 1. Source 1 may be the output of a pulse stream receiver or a presorting arrangement associated with the output of a pulse receiver. The stream of input pulses is coupled to a leading edge detector 2 which may include a flip flop which is clocked on at the first one megahertz (MHz) clock PA after the leading edge of an input pulse and is clocked off at the time of the next one MHz clock PA. The resultant pulses correspond to the leading edge of the pulses from source 2. The output of detector 2 is coupled to the input of time correlation shift register 3 with the input pulses from detector 2 being clocked into and shifted through register 3 by a one MHz clock PA at the output of source 4.

Shift register 3 includes there along in a time spaced relationship N groups of $n$ outputs or bistable stages, where N is equal to an integer greater than one and $n$ is an integer greater than zero. For the system illustrated in FIG. 1 it is desired to detect a first plurality of sequences of time spaced pulses having PRI's in the range of 400 microseconds ($\mu$s) to 401 $\mu$s. The detection of these plurality of sequences is accomplished by employing the presence of two time spaced pulses of each sequence to produce an output signal from time correlation detector 5. In the equipment illustrated in FIG. 1 N is equal to two, the first group being input stage 6 of register 3 and the second group being stages 7 and 8 of register 3, with $n$ being equal to one in the first group (stage 6) and n being equal to two in the second group (stages 7 and 8). It will be noted that a plurality of delay stages 9 are provided between input stage 6 and stages 7 and 8 to provide a sufficient time delay so as to enable detection of the plurality of sequences of time spaced pulses in the range of 400–401 $\mu$s.

Time correlation detector 5 includes logic circuitry one form of which includes OR gate 10 coupled to the binary "1" output of each of the bistable stages 7 and 8 and AND gate 11 coupled to the output of gate 10 and the binary "1" output of input stage 6. AND gate 11 will produce an output pulse (binary"1") when a sequence of time spaced pulses produce a binary "1" output signal from stage 6 and a binary "1" output signal from either of stages 7 and 8 due to the simultaneous presence of the time spaced pulses in these stages.

Thus, for the arrangement just described there is provided a digital time delay correlator which will produce an output pulse for any sequence of time spaced pulses having a PRI in the range of 400–401 $\mu$s.

To enable the prediction of when the next pulse of any of the sequences of pulses which produce an output pulse from AND gate 11 should occur the output pulse from AND gate 11 is coupled to the input stage 12 of time prediction shift register 13. The output pulses from AND gate 11 are clocked into and through shift register 13 by means of a clock pulse TB which is provided at the output of delay device 14 having its input coupled to the output of source 4. The delay of device 14 is such that there is a phase shift between clock PA and clock PB of some predetermined amount and more specifically one half of a clock pulse repetition period as illustrated in Curves 15 and 16.

The output pulses from gate 11 are clocked through delay stages 17, the number of which are determined by the PRI and PRI range, to four output stages 18, 19, 20 and 21 with the resultant PRI range being encompassed by the width of the time prediction gate (TPG) produced by time prediction gate generator 23 in the form of OR gate 22. As illustrated the inputs to gate 22 are coupled to the "1" output of stages 18–21 so that when a pulse is shifted through these stages the TPG is provided with a width of 4 us which encompasses the pulses being detected. The resultant TPG signal with its accompanying time displacement with respect to the output of gate 11 predicts when the next pulse of the sequences being detected in register 3 and detector 5 should occur. This TPG signal can be employed with equipment (not shown) before source 1, or as a component of source 1, to presort the pulses in the stream of input pulses so that only a few pulses of a highly dense pulse environment are clocked into register 3 for detection in detector 5 after the equipment of FIG. 1 is in operation. Thus, the pulses clocked into the input of register 3 are those pulses that have the best chance of being time correlated with the previous pulses of the detected sequences of time spaced pulses. This presorting arrangement under control of the TPG signal output is like a course selector prior to the fine detection that takes place in the digital delay line correlator including register 3 and detector 5.

Referring to FIG. 2, there is illustrated therein another embodiment of the digital delay line correlator that would be employed in conjunction with register 13 and generator 23 to provide the results described with respect to FIG. 1, but subject to less error than the arrangement of FIG. 1. It will be noted that when switch 24 is in the position illustrated it takes three pulses of each sequence of a plurality of sequences to produce an output. This will increase the accuracy of detecting pulse sequences having PRI's in a PRI range with respect to the arrangement shown in FIG. 1.

In the arrangement of FIG. 2 the N groups of n bistable stages are arranged along shift register 3 time spaced with respect to each other by the delay stages 25 and 26 so as to detect those sequences of time spaced pulses having a PRI in the range of 400–401 $\mu$s. In the illustration of FIG. 2 N is equal to three and $n$ is equal to one in the inputs stage 27 (first group), $n$ is equal to two as illustrated by stages 28 and 29 (the second group) and $n$ is equal to three as illustrated by stages 30, 31 and 31a (the third group).

The correlation detector is modified with respect to the illustration of FIG. 1 by including two OR gates 32 and 33, gate 32 being connected to the "1" output of stages 28 and 29 and OR gate 33 being coupled to the "1" output of stages 30, 31 and 31a. When there is a pulse in either of stages 28 or 29 and there is a pulse present in either of the stages 30 or 31 or 31a and there is a pulse present in the input stage 27, AND gate 34 will produce an output pulse indicating the detection of a sequence of time spaced pulses having a PRI in the range of 400–401 $\mu$s. This arrangement is considered a three out of three (3/3) digital time delay correlator. The output from gate 34 is then coupled through switch 24 to register 13 with the operation of register 13 and generator 23 being as described hereinabove with respect to FIG. 1.

Occasionally due to noise or other form of interference one of the pulses in one of the plurality of sequences may be missing and thus the detection of a sequence of time spaced pulses having a PRI in a range of 400–401 $\mu$s would be missed and, therefore, could cause error in other processing equipment (not shown) with which the correlator of the present invention may be employed.

To overcome this source of error, detector 5 incorporates therein an arrangement to detect any of the sequences of time spaced pulses having PRI's in the desired range of PRI's even though one of the pulses of a sequence of time spaced pulses is missing. One arrangement is illustrated by moving switch 24 to contact 35. In this arrangement AND gate 36 produces an output for coupling to OR gate 37 when there are pulses present in stage 27 and in stages 28 or 29. This latter arrangement is very similar to that illustrated in FIG. 1.

With switch 24 connected to contact 35, AND gate 38 will produce an output pulse for coupling to OR gate 37 indicating the presence of a sequence having a PRI in the range of 400–401 $\mu$s if there is a pulse present in stage 27 and there is a pulse present in either of the stages 30 or 31 or 31a, there being a missing pulse that should occur in either of stages 28 or 29.

With switch 24 connected to contact 35, AND gate 38a will produce an output pulse for coupling to OR gate 37 indicating the presence of a sequence having a PRI in the range of 400–401 $\mu$s if there is a pulse present in either of the stages 28 or 29 and there is a pulse present in either of the stages 30 or 31 or 31a, there being a missing pulse that should occur in stage 27.

The arrangement of detector 5 with switch 24 connected to contact 35 can be referred to as a two out of three (⅔) digital time delay correlator.

As is obvious from the illustration and discussion relative to FIGS. 1 and 2, the logic circuitry of detector 5 is relatively simple. We will now turn to FIG. 3 which illustrates a more complex time delay correlator wherein it is desired to detect M plurality of sequences of time spaced pulses wherein each of the M plurality of sequences having a different one of a plurality of PRI's disposed within a given PRI range with the plurality of PRI's being different for each of the M plurality of sequences. M is an integer greater than one and as illustrated in FIG. 3 has the value of ten. The arrangement of FIG. 3 is also such that only three of four pulses (where N is equal to four) of any of the M plurality of sequences involved will provide an output pulse from its associated one of time correlation detectors 5a to 5j. As illustrated it is desired to detect a plurality of sequences of time spaced pulses having a PRI in the range of 400–401 $\mu$s, to detect the plurality of sequences of time spaced pulses in the range of 401–402 $\mu$s and so forth up to and including a plurality of sequences of time spaced pulses having PRI's in the range of 409–410 microseconds.

To accomplish this there are provided ten substantially identical time correlation detectors 5 and a lengthened shift register 3. Register 3 includes register A having $n$ equal to three bistable stages or outputs, register B having $n$ equal to twelve bistable stages or outputs separated from register A by a register B delay section 39, register C having $n$ equal to twenty-two bistable stages or outputs separated from register B by the register C delay 40 and register D having $n$ equal to thirty-two bistable stages separated from register C by a register D delay 41.

The logic circuitry of each of the time delay correlation detectors 5a–5j include logic circuitry which is associated with certain ones of the bistable stages of each of the registers A, B, C and D where the stages of the various registers are identified by the letter referencing the register with a subscript. For instance, the three stages of register A are $A_{-1}$, $A_0$ and $A_1$. The various stages to which the time correlation detectors 5a–5j are connected are illustrated in the drawing by the stage identification connected to each of the multiple conductors between register 3 and detectors 5 and also in Table I.

TABLE I

| PULSE REPETITION INTERVAL IN US | STAGES IN REGISTER A | STAGES IN REGISTER B | STAGES IN REGISTER C | STAGES IN REGISTER D |
|---|---|---|---|---|
| 400 | $A_{-1}A_0A_1$ | $B_0B_1B_2$ | $C_0C_1C_2C_3$ | $D_{-1}D_0D_1D_2D_3$ |
| 401 | $A_{-1}A_0A_1$ | $B_1B_2B_3$ | $C_2C_3C_4C_5$ | $D_2D_3D_4D_5D_6$ |
| 402 | $A_{-1}A_0A_1$ | $B_2B_3B_4$ | $C_4C_5C_6C_7$ | $D_5D_6D_7D_8D_9$ |
| 403 | $A_{-1}A_0A_1$ | $B_3B_4B_5$ | $C_6C_7C_8C_9$ | $D_8D_9D_{10}D_{11}D_{12}$ |
| 404 | $A_{-1}A_0A_1$ | $B_4B_5B_6$ | $C_8C_9C_{10}C_{11}$ | $D_{11}D_{12}D_{13}D_{14}D_{15}$ |
| 405 | $A_{-1}A_0A_1$ | $B_5B_6B_7$ | $C_{10}C_{11}C_{12}C_{13}$ | $D_{14}D_{15}D_{16}D_{17}D_{18}$ |
| 406 | $A_{-1}A_0A_1$ | $B_6B_7B_8$ | $C_{12}C_{13}C_{14}C_{15}$ | $D_{17}D_{18}D_{19}D_{20}D_{21}$ |
| 407 | $A_{-1}A_0A_1$ | $B_7B_8B_9$ | $C_{14}C_{15}C_{16}C_{17}$ | $D_{20}D_{21}D_{22}D_{23}D_{24}$ |
| 408 | $A_{-1}A_0A_1$ | $B_8B_9B_{10}$ | $C_{16}C_{17}C_{18}C_{19}$ | $D_{23}D_{24}D_{25}D_{26}D_{27}$ |
| 409 | $A_{-1}A_0A_1$ | $B_9B_{10}B_{11}$ | $C_{18}C_{19}C_{20}C_{21}$ | $D_{26}D_{27}D_{28}D_{29}D_{30}$ |

The various output pulses produced from correlators 5a–5j are coupled, as are the previous embodiments, to a time prediction shift register 13 which includes therein not only the four output stages of shift register 13 as illustrated in FIG. 1 with its associated register delay, but also an input stage for each of the output pulses of detectors 5a–5j. In other words, the input section of register 13 includes ten stages. Thus, the length of shift register 13 as compared with register 13 of FIG. 1 has (M-1) additonal input stages positioned to the left of input stage 12 of register 13 illustrated in FIG. 1. Through the means of shift register 13 and time prediction gate generator 23 a TPG signal is produced for every one of the M plurality of sequences of time spaced signals so as to predict when the next pulse of each of these sequences of time spaced pulses should occur.

Referring now to FIG. 4, there is illustrated therein one form of the logic circuitry associated with selected ones of the stages of each of the registers A, B, C and D to produce an output pulse for each of a plurality of sequences of time spaced pulses having a PRI in the range of 400–401 $\mu$s. The logic circuitry illustrated in FIG. 4 is determined according to the following logic equation.

Logic equation 1 for a 400 $\mu$s PRI $$\text{Output} = A_0[B_0(D_0+D_1+C_0\overline{D}_{-1}+\underline{C_1\overline{D}_2})+B_1(C_1\overline{D}_2+D_1)+C_1D_1+C_0(D_0+D_1)] \\ +A_1D_3(B_1+B_2+C_2+C_3)+\overline{A}_0\overline{A}_1\{\overline{A}_{-1}B_0C_0D_0+B_1D_2(C_1+C_2)\}$$

Equation 1 can be rearranged as follows:

$$\text{Output} = A_0[B_0D_0+B_0D_1+B_0C_0\overline{D}_{-1}+B_0C_1\overline{D}_2+B_1C_1\overline{D}_2+B_1D_1+C_1D_1+C_0D_0+C_0D_1]$$

$+A_1D_3(B_1+B_2+C_2+C_3)+(\overline{A_0A_1})(\overline{A}_{-1}B_0C_0D_0)+(\overline{A_0A_1})(B_1D_2)(C_1+C_2)$ employing the rearranged equation of equation 1 the various terms of this rearranged equation define the logical operation of certain ones of the gates 50–83.

The gates and type of gates involved in the logical operation each of the terms of the rearranged equation are illustrated hereinbelow in Table II.

present in equation 1 is substituted for the stage present in equation 1.

Logic equation 2 for a 401 μs PRI

Output $=A_0[B_1(D_3+D_4+C_2\overline{D_2}+C_2\overline{D_3})+B_3(C_3\overline{D_5}+D_4)+C_3D_4+C_3(D_3+D_4)]$
$+A_1D_6(B_2+B_3+C_4+C_5)+\overline{A_0A_1}[\overline{A}_{-1}B_1C_2D_3+B_2D_5(C_3+C_4)]$ Logic equation 3 for a 402 μs PRI Output $=A_0[B_2(D_6+D_7+C_3\overline{D_5}+C_3\overline{D_6})+B_3(C_3\overline{D_8}+D_7)+C_5D_7+C_4(D_6+D_7)]$
$+A_1D_9(B_3+B_4+C_6+C_7)+\overline{A_0A_1}[\overline{A}_{-1}B_2C_4D_6+B_3D_8(C_5+C_6)]$ Logic equation 4 for a 403 μs PRI Output $=A_0[B_3(D_9+D_{10}+C_8\overline{D_8}+C_2\overline{D_{11}})+B_4(C_7\overline{D_{11}}+D_{10})+C_7D_{10}+C_6(D_9+D_{10})]$
$+A_1D_{12}(B_4+B_5+C_8+C_9)+\overline{A_0A_1}[\overline{A}_{-1}B_3C_8D_9+B_4D_{11}(C_7+C_8)]$ Logic equation 5 for a 404 μs PRI

TABLE II

| REARRANGED TERMS OF EQUATION (1) | GATES OF FIG. 4 INVOLVED | | | | |
|---|---|---|---|---|---|
| | PRIMARY GATES | SECONDARY GATES | TERTIARY GATES | QUATERNARY GATES | QUINARY GATE |
| $B_0D_0$ | AND 50 | } NOR 54 } NOT 55 | } OR 64 | } AND 65 | |
| $B_0D_{-1}$ | AND 51 | | | | |
| $B_0C_0\overline{D}_{-1}$ | AND 52 | | | | |
| $B_0C_0\overline{D}_1$ | AND 53 | | | | |
| $B_1C_1\overline{D}_2$ | AND 56 | | | | |
| $B_1D_1$ | AND 57 | } NOR 60 } NOT 61 | | | |
| $C_1D_1$ | AND 58 | | | | |
| $C_0D_0$ | AND 59 | | | | |
| $C_0D_1$ | NAND 62, NOT 63 | | | | } OR 83 |
| $A_0$ | | | | | |
| $B_1+B_2$ | NOR 66, NOT 67 | } OR 70 | } AND 71 | | |
| $C_2+C_3$ | NOR 68, NOT 69 | | | | |
| $A_1D_3$ | | | | | |
| $\overline{A_0A_1}$ | NOTS 72&73, AND 74 | } AND 76 | | | |
| $B_0C_0D_0$ | NAND 75 | | | | |
| $\overline{A}_{-1}$ | | | | | |
| $\overline{A_0A_1}$ | NOTS 72&73, AND 74 | } AND 81 | } AND 82 | | |
| $B_1D_2$ | NAND 77, NOT 78 | | | | |
| $C_1+C_2$ | NOR 79, NOT 80 | | | | |

Output $=A_0[B_4(D_{12}+D_{13}+C_8\overline{D_{11}}+C_9\overline{D_{14}})+B_5(C_9\overline{D_{14}}+D_{13})+C_9D_{13}+C_8(D_{12}+D_{13})]$
$+A_1D_{15}(B_5+B_6+C_{10}+C_{11})+\overline{A_0A_1}[\overline{A}_{-1}B_4C_9D_{12}+B_5D_{14}(C_9+C_{10})]$ There is presented hereinbelow logic equations 2 to Logic equation 6 for a 405 μs PRI Output $=A_0[B_5(D_{15}+D_{16}+C_{10}\overline{D_{14}}+C_{11}\overline{D_{17}})+B_6(C_{11}\overline{D_{17}}+D_{16})+C_{11}D_{16}+C_{10}(D_{15}+D_{16})]$
$+A_1D_{18}(B_6+B_7+C_{12}+C_{13})+\overline{A_0A_1}[\overline{A}_{-1}B_5C_{10}D_{15}+B_6D_{17}(C_{11}+C_{12})]$ 10 for each of the PRI ranges involved in FIG. 3 which Logic equation 7 for a 406 μs PRI Output $=A_0[B_6(D_{18}+D_{19}+C_{12}\overline{D_{17}}+C_{13}\overline{D_{20}})+B_7(C_{13}\overline{D_{20}}+D_{19})+C_{13}D_{19}+C_{12}(D_{18}+D_{19})]$
$+A_1D_{21}(B_7+B_8+C_{14}+C_{15})+\overline{A_0A_1}[\overline{A}_{-1}B_6C_{12}D_{18}+B_7D_{20}(C_{13}+C_{14})]$ were derived from equation (1) and the various stage Logic equation 8 for a 407 μs PRI Output $=A_0[B_7(D_{21}+D_{22}+C_{14}\overline{D_{20}}+C_{15}\overline{D_{23}})+B_8(C_{15}\overline{D_{23}}+D_{22})+C_{15}D_{22}+C_{14}(D_{21}+D_{22})]$
$+A_1D_{24}(B_8+B_9+C_{16}+C_{17})+\overline{A_0A_1}[\overline{A}_{-1}B_7C_{14}D_{21}+B_8D_{23}(C_{15}+C_{16})]$ of registers A, B, C and D presented in TABLE I keeping in mind that the identified stage below the stage Logic equation 9 for a 408 μs PRI Output $=A_0[B_8(D_{24}+D_{23}+C_{18}\overline{D}_{23}+C_{12}\overline{D}_{26})+B_9(C_{17}\overline{D}_{26}+D_{25})+C_{17}D_{25}+C_{18}(D_{24}+D_{25})]$
$+A_1D_{27}(B_9+B_{10}+C_{18}+C_{19})+\overline{A}_0\overline{A}_1[\overline{A}_1B_8C_{16}D_{24}+B_9D_{26}(C_{17}+C_{18})]$ Logic equation 10 for a 409 μs PRI Output $=A_0[B_9(D_{27}+D_{26}+C_{19}\overline{D}_{26}+C_{19}\overline{D}_{29})+B_{10}(C_{19}\overline{D}_{29}+D_{28})+C_{19}D_{28}+C_{18}(D_{27}+D_{28})]$
$+A_1D_{30}(B_{10}+B_{11}+C_{20}+C_{21})+\overline{A}_0\overline{A}_1[\overline{A}_1B_9C_{18}D_{27}+B_{10}D_{29}(C_{19}+C_{20})]$ The actual logic circuitry for detectors $5_0$-$5_j$ can be derived by rearranging equations 2 to 10 so that the rearranged terms have the same order as the rearranged terms of equation 1. Then employing TABLE II and substituting the terms from equations 2 – 10 for the terms of equation 1 in TABLE II having a corresponding order the type of gate to employ to carry out the logic operations of a specific term can be identified from TABLE II.

In view of the foregoing discussion it will be appreciated that the digital time delay correlator in accordance with the principles of the present invention is capable of detecting a plurality of sequences of time spaced pulses with each of the plurality of sequences having a different one of a plurality of PRI's in a given PRI range, or M plurality of sequences of time spaced pulses where each of the plurality of sequences of each of the M plurality of sequences have a different PRI in a given PRI range. This is in contrast to the prior art arrangement wherein only a single sequence of time spaced pulses can be detected in a digital time delay correlator employing a single digital delay line. In addition the output of the time correlation detector of the digital time delay correlator in accordance with the present invention can be used to produce a gate signal that predicts when the next pulse of each of the sequences of time spaced pulses producing the output from the correlation detector should occur for that particular sequence.

While we have described above the principles of our invention in connection with specific apparatus it is to be more clearly understood that this description is made only by way of example and not as a limitation to the scope of our invention as set forth in the objects thereof and in the accompanying claims.

We claim:

1. An arrangement to detect in a stream of input pulses at least a first plurality of sequences of time spaced pulses, each of said first sequences having a different one of a plurality of pulse repetition intervals disposed within at least one given pulse repetition interval range comprising:

a first source of said stream of input pulses;

a first means coupled to said source to store said stream of input pulses in time such that the time relationship of each of said input pulses relative to each other as received from said source is maintained, said first means having N groups of $n$ outputs disposed at different spaced time positions relative to each other such that the time difference between certain ones of said $n$ outputs of adjacent ones of said N groups of $n$ outputs define said plurality of pulse repetition intervals and the time difference between certain ones of said $n$ outputs of at least one of said N groups of $n$ outputs defines said given pulse repetition interval range, where N is an integer greater than one and $n$ is an integer greater than zero;

second means coupled to said N groups of $n$ outputs to provide an output pulse when said time spaced pulses of said first plurality of sequences of time spaced pulses are simultaneously present at certain ones of said $n$ outputs of a given number of said N groups of $n$ outputs; and third means coupled to said second means responsive to said output pulse to produce a gate pulse defining the time at which the next pulse of each of said first plurality of sequences should arrive from said first source.

2. An arrangement according to claim 1, wherein said first means includes a second source of clock pulses having a given frequency, and a digital shift register having a plurality of bistable stages, said register being coupled to said first and second source to store and sequentially shift said input pulses of said stream of input pulses therethrough under control of said clock pulses; and each of said N groups of n outputs include at least one output of $n$ adjacent ones of said certain ones of said plurality of bistable stages, the adjacent ones of N groups of said $n$ bistable stages being separated by a predetermined number of adjacent ones of others of said plurality of bistable stages, said predetermined number being determined by said plurality of pulse repetition intervals.

3. An arrangement according to claim 2, wherein said second means includes first logic circuitry coupled to each of said $n$ bistable stages of each of said N groups of $n$ bistable stages.

4. An arrangement according to claim 3, wherein N is equal to two or more; and said first logic circuitry produces said output pulse when said time spaced pulses of at least one of said first plurality of sequences are simultaneously present at the appropriate one of said $n$ bistable stages of each of said N groups of $n$ bistable stages.

5. An arrangement according to claim 4, wherein $n$ is equal to one in that one of said N groups of said $n$ bistable stages adjacent to said first source and $n$ is equal to an integer greater than one in the remainder of said N groups of said $n$ bistable stages.

6. An arrangement according to claim 3, wherein N is equal to an integer greater than two; and said first logic circuitry produces said output pulse when said time spaced pulses of at least one of said first plurality of sequences are simultaneously present at the appropriate ones of said $n$ bistable stages of (N-1) of said N groups of said bistable stages.

7. An arrangement according to claim 6, wherein $n$ is equal to an integer greater than one in all of said N groups of said $n$ bistable stages.

8. An arrangement according to claim 3, wherein said stream of input pulses includes M plurality of sequences of time spaced pulses, each of said M plurality of sequences having a different one of a plurality of pulse repetition intervals disposed within at least one given pulse repetition interval range, said plurality of pulse repetition intervals being different for each of said M plurality of sequences, where M is an integer greater than one;

the number of said n bistable stages of each of said N groups of said n bistable stages being determined by the value of M; and M different logic circuitry, each of said M different logic circuitry being coupled to selected ones of said $n$ bistable stages of each of said N groups of said $n$ bistable stages to produce M independent output pulses, each of said independent output pulses responding to a different one of said M plurality of sequences.

9. An arrangement according to claim 8, wherein N is equal to two or more; and each of said M logic circuitry produces its associated one of said M independent output pulses when said time spaced pulses of at least one of said plurality of sequences of each of said M plurality of sequences are simultaneously present at the appropriate one of said $n$ bistable stages of each of said N groups of said $n$ bistable stages.

10. An arrangement according to claim 9, wherein $n$ is equal to an integer greater than two in all of said N groups of said $n$ bistable stages.

11. An arrangement according to claim 1, wherein said third means includes a second source of clock pulses having a given frequency, a digital shift register having a plurality of bistable stages, said register being coupled to said second source and said second means to store and sequentially shift said output pulse therethrough from an input bistable stage to an output bistable stage under control of said clock pulses, the number of said bistable stages being determined by said plurality of pulse repetition intervals and a predetermined width of said gate pulse, and logic circuitry coupled to a given number of said bistable stages including said output bistable stage to produce said gate pulse, the value of said given number being determined by said predetermined width.

12. An arrangement according to claim 1, wherein said first means includes a second source of first clock pulses having a given frequency, and a first digital shift register having a plurality of bistable stages, said first register being coupled to said first and second source to store and sequentially shift said input pulses of said stream of input pulses therethrough under control of said first clock pulses;

each of said N groups of $n$ outputs includes at least one output of $n$ adjacent ones of certain ones of said plurality of bistable stages, the adjacent ones of N groups of said $n$ bistable stages being separated by a predetermined number of adjacent ones of others of said plurality of bistable stages, said predetermined number being determined by said plurality of pulse repetition intervals;

said second means includes first logic circuitry coupled to each of said $n$ bistable stages of each of said N groups of said $n$ bistable stages; and said third means includes a third source of second clock pulses having said given frequency but phase shifted with respect to said first clock pulses, a second digital shift register having a plurality of bistable stages, said second register being coupled to said second source and said second means to store and sequentially shift said output pulse from an input bistable stage to an output bistable stage therethrough under control of said second clock pulses, the number of said bistable stages being determined by said plurality of pulse repetition intervals and a predetermined width of said gate pulses, and second logic circuitry coupled to a given number of adjacent ones of said bistable stages including said output bistable stage to produce said gate pulse, the value of said given number being determined by said predetermined width.

13. An arrangement according to claim 12, wherein N is equal to two or more; and said first logic circuitry produces said output pulse when said time spaced pulses of at least one of said first plurality of sequences are simultaneously present at the appropriate one of said n bistable stages of each of said N groups of said n bistable stages.

14. An arrangement according to claim 13, wherein $n$ is equal to one in that one of said N groups of said $n$ bistable stages adjacent to said first source and $n$ is equal to an integer greater than one in the remainder of said N groups of said $n$ bistable stages.

15. An arrangement according to claim 12, wherein N is equal to an integer greater than two; and said first logic circuitry produce said output pulse when said time spaced pulses of at least one of said first plurality of sequences are simultaneously present at the appropriate ones of said n bistable stages of (N-1) of said N groups of said bistable stages.

16. An arrangement according to claim 15, wherein $n$ is equal to an integer greater than one in all of said N groups of said $n$ bistable stages.

17. An arrangement according to claim 12, wherein said stream of input pulses includes M plurality of sequences of time spaced pulses, each of said M plurality of sequences having a different one of a plurality of pulse repetition intervals disposed within at least one given pulse repetition interval range, said plurality of said repetition intervals being different for each of said M plurality of sequences, where M is an integer greater than one;

the number of said $n$ bistable stages of each of said N groups of said $n$ bistable stages of said first register being determined by the value of M;

M different first logic circuitry, each of said M different first logic circuitry being coupled to selected ones of said n bistable stages of each of said N groups of said $n$ bistable stages to produce M independent output pulses, each of said M independent output pulses responding to a different one of said M plurality of sequences; and said second register includes M input stages, each of said input stages being coupled to the output of a different one of said M first logic circuitry and the number of said bistable stages of said second register is increased by (M-1) bistable stages.

18. An arrangement according to claim 17, wherein N is equal to two or more; and
each of said M first logic circuitry produce its associated one of said M independent output pulses when said time spaced pulses of at least one of said plurality of sequences of each of said M plurality of sequences are simultaneously present at the appropriate one of said n bistable stages of each of said N groups of said n bistable stages of said first register.

19. An arrangement according to claim 18, wherein n is equal to an integer greater than two in all of said N groups of said n bistable stages of said first register.

* * * * *